Figure 1:
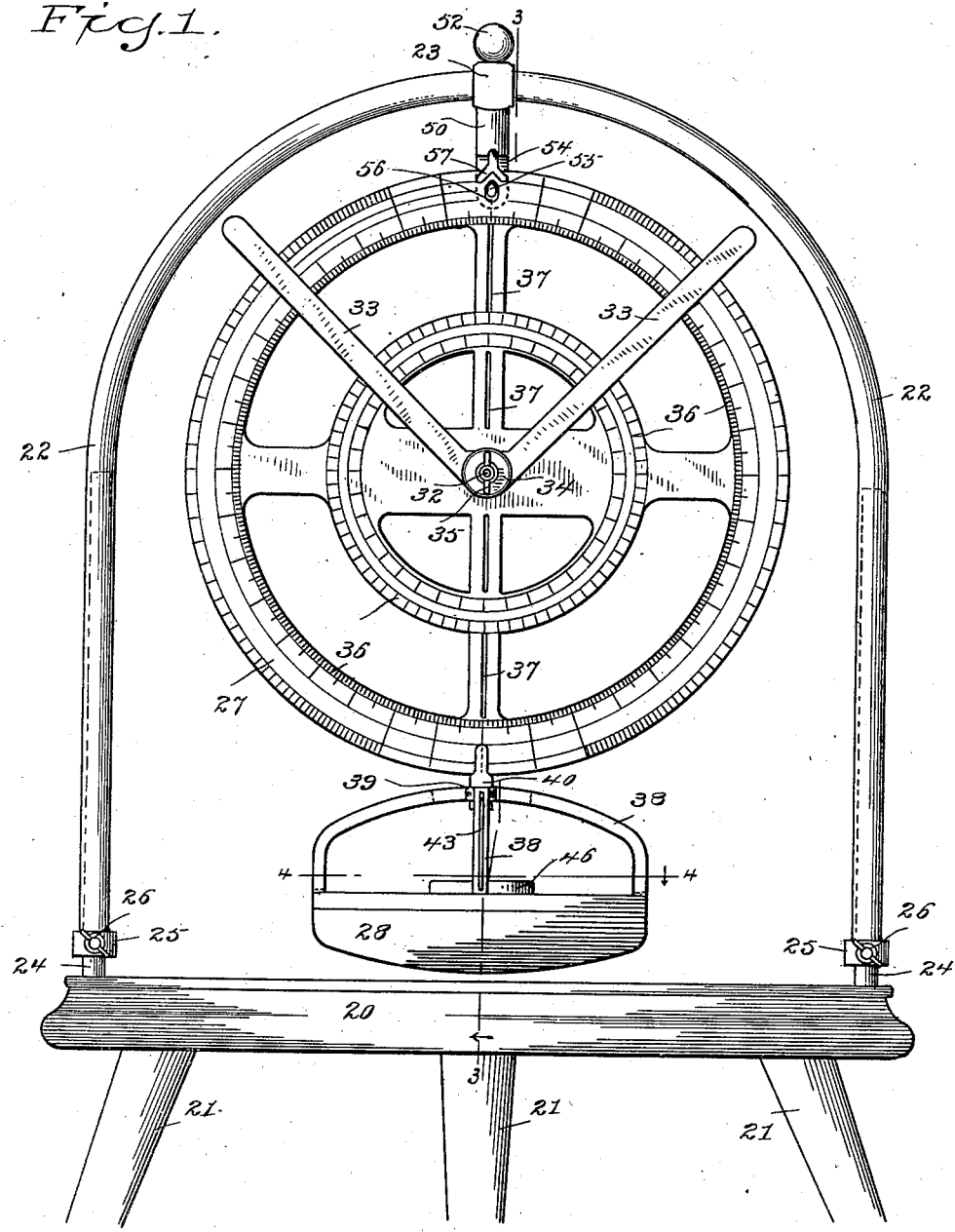

No. 663,252. Patented Dec. 4, 1900.
J. S. BOGARDUS.
LEVELING, PLUMBING, AND ANGLE MEASURING INSTRUMENT.
(Application filed June 11, 1900.)

(No Model.) 3 Sheets—Sheet 1.

WITNESSES
INVENTOR
John S. Bogardus

No. 663,252. Patented Dec. 4, 1900.
J. S. BOGARDUS.
LEVELING, PLUMBING, AND ANGLE MEASURING INSTRUMENT.
(Application filed June 11, 1900.)
(No Model.) 3 Sheets—Sheet 2.

WITNESSES

INVENTOR
John S. Bogardus
By

No. 663,252.
Patented Dec. 4, 1900.
J. S. BOGARDUS.
LEVELING, PLUMBING, AND ANGLE MEASURING INSTRUMENT.
(Application filed June 11, 1900.)
(No Model.)
3 Sheets—Sheet 3.
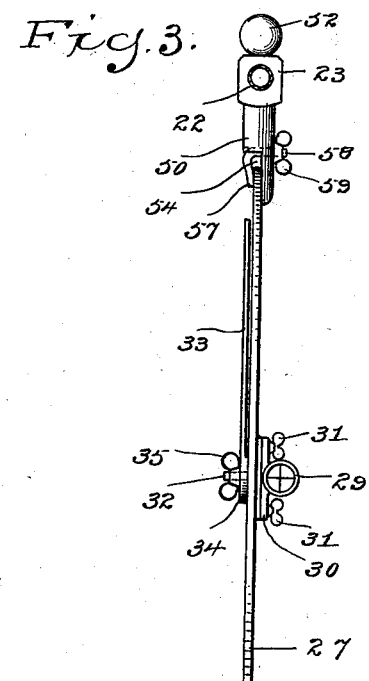
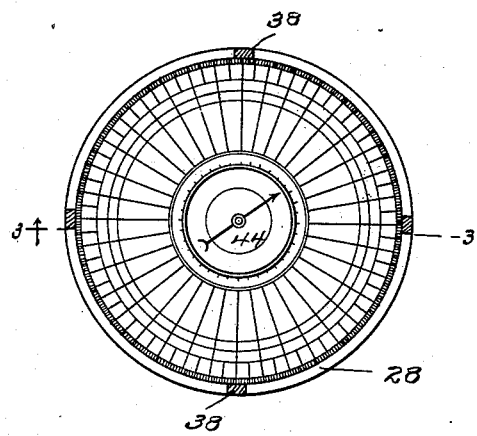
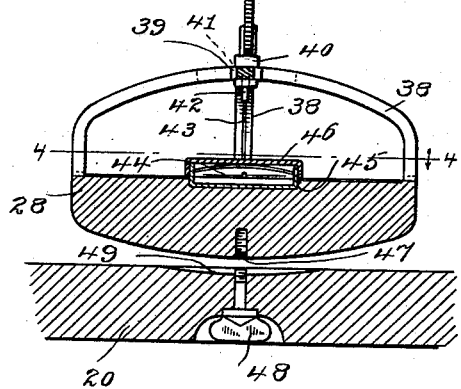
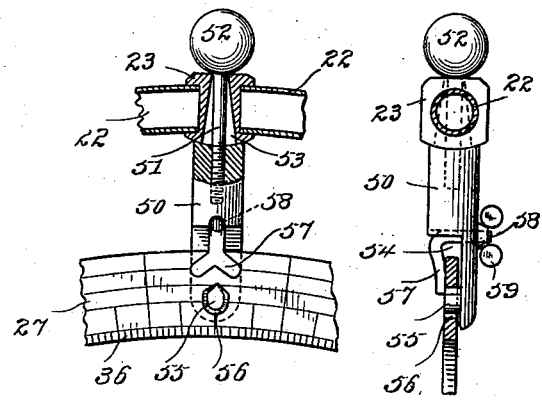
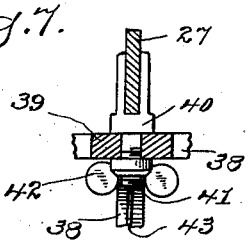
WITNESSES
INVENTOR
John S. Bogardus
By A. M. Wooster
Atty.

UNITED STATES PATENT OFFICE.

JOHN S. BOGARDUS, OF STAMFORD, CONNECTICUT.

LEVELING, PLUMBING, AND ANGLE-MEASURING INSTRUMENT.

SPECIFICATION forming part of Letters Patent No. 663,252, dated December 4, 1900.

Application filed June 11, 1900. Serial No. 19,809. (No model.)

*To all whom it may concern:*

Be it known that I, JOHN S. BOGARDUS, a citizen of the United States, residing at Stamford, county of Fairfield, State of Connecticut, have invented a new and useful Leveling, Plumbing, and Angle-Measuring Instrument, of which the following is a specification.

My invention has for its object to provide an instrument adapted for general use by architects, contractors, and mechanics in measuring and estimating for either long or short distances in connection with excavating, building foundations, leveling, grading, plumbing walls, &c., and also in connection with the general work of carpenters, builders, masons, and mechanics in the construction of buildings.

Among the incidental uses to which my novel instrument may be applied with results equally accurate with the more expensive instruments it is sufficient for the purposes of this specification to mention the locating and staking out of building-lines, excavations, foundation-walls, and curbings, the determination of all grades and angles, the plumbing of both brick and frame buildings, the leveling of courses of brick, the ascertainment of pitches and slopes of roofs, and the laying of drain-pipe. Various other instruments have heretofore been applied to the different uses enumerated above. An important objection to all of these instruments, however, so far as I am aware, has been that their expense is so great as to place them beyond the reach of many architects, contractors, builders, and mechanics whose business is principally confined to small jobs, but who have frequent use for an accurate leveling, plumbing, and angle-measuring instrument. Another objection to many of the instruments of this class now offered for sale, even where the objection of expense is not so material, is that they are so complicated as to require technical knowledge of a high grade in order to use them at all, so that as a matter of fact, owing to high prices and complicated construction, high-grade leveling, plumbing, and angle-measuring instruments have been kept out of general use by small builders, contractors, and general jobbers.

The special object of my invention, therefore, is to provide a leveling, plumbing, and angle-measuring instrument equally adapted for general use upon both large and small jobs and for long and short distances, which will do all the work that can be required of any instrument of its class, may be applied to uses to which many of them are not applicable, which shall be so relatively inexpensive as to place it within the reach of all, and so simple in construction and easy to use as to render a high grade of technical knowledge unnecessary, thereby adapting the instrument for use by the smaller contractors and jobbers who have heretofore depended largely upon estimates without measurement or else have employed others to take their measurements for them.

With the above ends in view I have devised a simple and novel leveling, plumbing, and angle-measuring instrument, which I will now describe, referring to the accompanying drawings, forming part of this specification, and using reference characters to designate the several parts.

Figure 2:
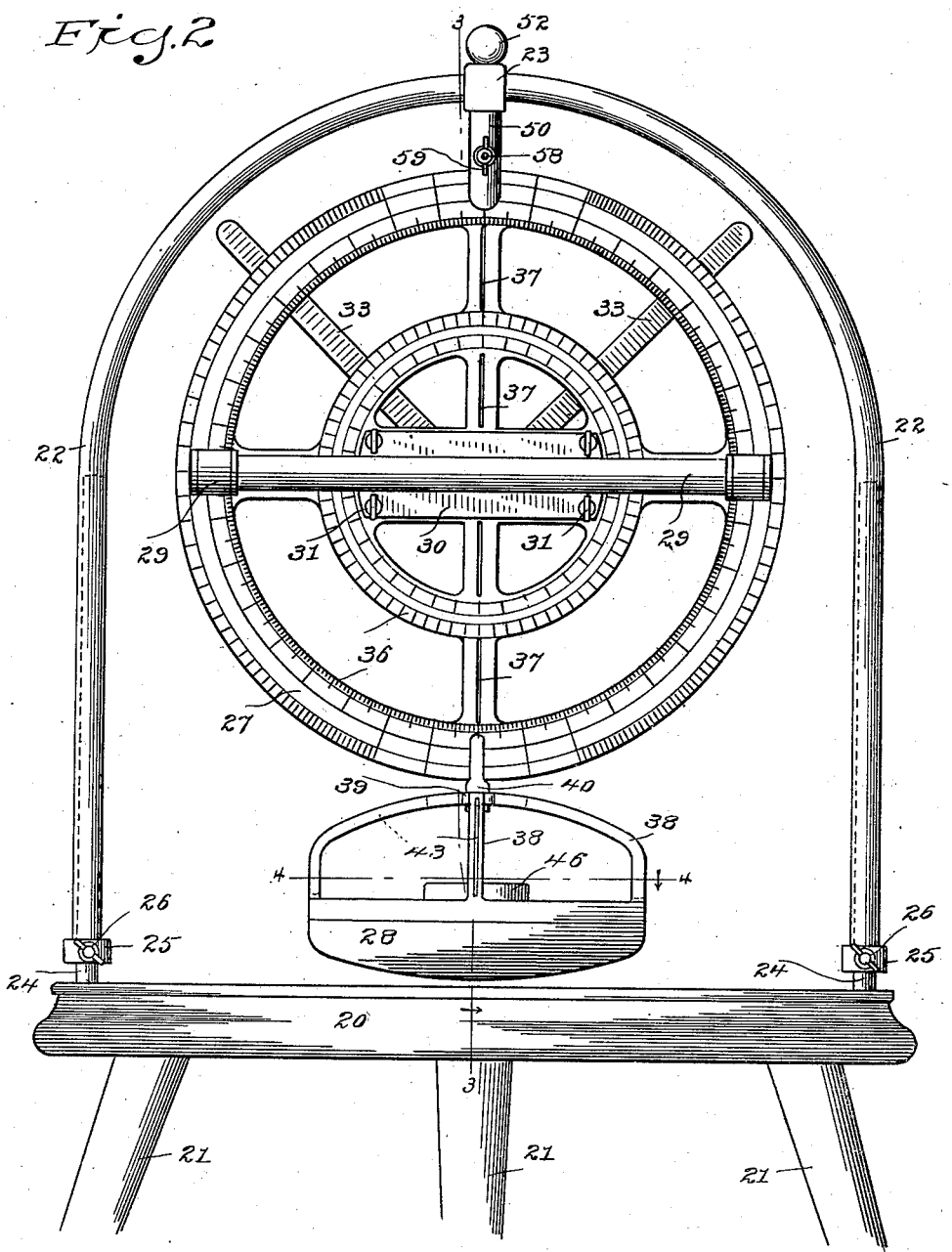

Figure 1 is a front elevation of my novel instrument complete; Fig. 2, a corresponding rear elevation; Fig. 3, a vertical section on the line 3 3 in Figs. 1, 2, and 4; Fig. 4, a transverse section of the plummet-arms on the line 4 4 in Figs. 1, 2, and 3; Fig. 5, a detail view, on an enlarged scale, illustrating the connection of the dial-plate to the frame; Fig. 6, an edge view corresponding therewith, and Fig. 7 is a detail sectional view illustrating the connection of the plummet-arms to the dial-plate.

20 denotes a base or table, which may be round or angular, as preferred, and may be made of either metal or wood. This table is supported by legs 21, which in practice are made telescopic (not shown in the drawings) in common with instruments of this class.

22 denotes a frame, preferably made of metal tubing and comprising either two, three, or four arms, as preferred, a frame consisting of two arms only being shown in the drawings. These arms curve upward and inward and are socketed in and soldered or otherwise rigidly secured to a head 23. The lower portions of the arms of the frame are made straight and receive rods or tubes 24, which are rigidly secured to and extend upward from the base. At the lower ends of the arms of the frame are collars 25, which carry thumb-screws 26, adapted to engage the rods to lock the frame at any convenient height above the base to meet the requirements of use.

27 denotes a dial-plate suspended from the head in a manner I shall presently describe in detail, and 28 a plummet or plumb-bob rotatively secured to the lower edge of the dial-plate. Upon the back of the dial-plate I provide a sight-tube or telescope 29, an ordinary simple form of sight-tube being of course sufficient for all ordinary uses where the distance is short and lenses being required only for long distances. The dial-plate swings freely from the head and is always maintained in the same position relatively to the plane of the horizon by the plummet. The sight-tube is secured to the dial-plate in such a manner as to lie at all times parallel to the plane of the horizon. I have shown the sight-tube as rigidly secured to a plate 30 and have shown said plate as secured to the dial-plate by thumb-screws 31. In practice these thumb-screws may pass through slots in plate 30 (not shown in the drawings) in order to provide for adjustment of the sight-tube relatively to the dial-plate, should such adjustment be necessary, in order to preserve perfect parallelism of the sight-tube with the plane of the horizon.

32 denotes a threaded stud extending outward from the front of the dial-plate, and 33 oscillating arms formed integral with or rigidly secured to a plate 34, which is journaled on said stud and may be locked in place, so as to fix the oscillating arms in any required position by means of a thumb-nut 35. (See Fig. 3.)

The special design of the dial-plate is of course not of the essence of my invention. In the drawings I have illustrated a light and ornamental style of dial-plate consisting of two rings connected by radial arms. Any other style of dial-plate may, however, be used, if preferred, and will be equally within the scope of my invention. The dial-plate is provided on both sides with sets of graduations, which I have indicated by 36, one set being graduated to degrees and minutes, another set to feet and inches. I have shown two revolving arms as a matter of convenience only. As shown in the drawings, these arms lie at an angle of ninety degrees to each other and the top line of each arm is radial to its center of oscillation. The use of the oscillating arms in connection with the sets of graduations, which in practice extend for convenience in oppposite directions, will be readily understood from Fig. 1.

37 denotes sight-slits in the dial-plate for use in plumbing the walls of buildings, &c.

The attachment of the plummet to the lower edge of the dial-plate is rigid, except as regards oscillation in the horizontal plane.

38 denotes arms which extend upward from the plummet and then curve inward and unite at the center, as at 39.

40 denotes a head which is soldered or otherwise rigidly secured to the lower edge of the dial-plate and is provided with a downwardly-extending threaded stud 41, which passes through the plummet-arms 38. The plummet is held in place on the stud and may be locked against rotation thereon by a thumb-nut 42. (See Fig. 7.) The plummet-arms 38 are provided with sight-slits 43 for use when sighting and locating angles in connection with a compass 44, which is set in a recess 45 in the top of the plummet and is provided with a cover 46.

47 denotes a threaded hole in the bottom of the plummet, which is adapted to be engaged by a thumb-screw 48, which extends upward through the base. The top of the base is provided with a recess 49, which is adapted to receive the plummet, the latter being locked securely in place therein when not in use by engagement of the thumb-screw with hole 47.

It is of course necessary that the attachment of the dial-plate to head 23 be such as to permit the dial-plate to swing and oscillate freely when in use and also to permit the dial-plate and plummet to be lowered so that the latter may be locked to the base when the instrument is not in use. I have shown the dial-plate as attached to a block 50, said block forming, with the under side of head 23, a ball-and-socket joint. The under side of the head is shown as spherical—i. e., a convex curve—and the top of the block as a corresponding concave curve, so that the block will move freely over the head in any direction. The block is kept closely in contact with the head by means of a bolt 51, having a spherical head 52, which lies upon the top of head 23 and in use oscillates freely thereon, the shank of the bolt passing through a downwardly and outwardly tapering recess 53 in the head and engaging the block, as clearly shown in Fig. 5.

I have shown in the drawings and preferably adopt in practice an adjustable attachment of the dial-plate to the block. (See Figs. 5 and 6.) In these views the block is shown as cut away upon the front, leaving a recess 54, from the back wall of which a stud 55 projects, said stud being preferably provided at the top with a knife-edge, as shown. The dial-plate is provided with a recess 56, which receives the knife-edged stud, and is held securely in place by a clamp 57, said clamp having a threaded shank 58, which passes through the block and is engaged by a thumb-nut 59.

Supposing the machine to have been in use and that it is desired to transport it or put it away, the operator loosens thumb-screws 26 and then loosens bolt 51 by means of head 52 and allows the plummet to drop down into recess 49 in the base, in which it is locked by means of thumb-screw 48. Having locked the plummet to the base the operator tightens up bolt 51 sufficiently to hold the dial-plate firmly in place and tightens up thumb-screws 26 to lock the frame in place, oscillating arms 33 being locked in place by means of thumb-nut 35.

When it is desired to use the instrument, the operator loosens thumb-screws 26, withdraws thumb-screw 48 from the plummet, and loosens bolt 51, after which the frame, and with it the dial-plate, plummet, and oscillating arms, may be raised to any convenient height for use, it being of course necessary that in use the plummet swing freely over the base. Having adjusted the frame to the required position, it is locked there by means of the thumb-screws 26. In practice in order to produce perfect smoothness of operation bolt 51 is preferably tightened sufficiently to draw the concave surface of block 50 close to the corresponding surface of head 23, leaving the parts loose enough, however, so that the block, dial-plate, and plummet may oscillate freely and keep the dial-plate at all times vertical to the plane of the horizon. If it is desired to have the dial-plate and plummet loose relatively to the block, thumb-nut 59 upon the shank of clamp 57 may be loosened slightly. If it is desired to have the plummet and plummet-arms free to oscillate in the horizontal plane, thumb-nut 42 is slightly loosened. The plummet may be made rigid with the dial-plate by tightening up said thumb-nut 42.

In using the instrument for the purpose of leveling stone walls, brick courses, &c., the instrument may be placed on a corner of the wall and through the operation of the plummet the sight-tube becomes level, no adjustment for the supports of the instrument being required. The operator, standing on the ground or on a scaffold, by revolving the dial-plate and sighting through the sight-tube may ascertain at a glance whether the wall is level at all points, and if it is out of level at any point how much so.

In using the instrument for the determination of grades, pitches of roofs, &c., the oscillating arms are used in connection with the dial-plate. The upper edges of the arms are radial to the center of oscillation and are used for taking the range. The arms may be moved in either direction to obtain a range with the line of the required grade or incline or with the pitch of a roof. When the range is secured, the arms are locked in place, and the upper edge of the arm will indicate the required grade, slope, or pitch both in feet and inches and in degrees and minutes.

In using the instrument for the purpose of locating and staking out building-lines, excavations, foundation-walls, and curbings the instrument is placed in any convenient position. The plummet is then oscillated so that the sight-slits in the plummet-arms will range in the direction required for one of the lines which may then be staked, the compass-dial being used to locate the line in accordance with the plot.

Having thus described my invention, I claim—

1. In an instrument of the character described the combination with a freely-suspended plate 27 provided with graduations 36 and a plummet attached to said plate, of an oscillating arm 33 pivoted at the center of said plate and having an edge radial to the pivotal point, said edge being adapted to register with the graduations.

2. In an instrument of the character described the combination with a freely-suspended plate 27 provided with graduations 36 and a plummet attached to said plate, of two oscillating arms secured together at a right angle and pivoted at the center of the plate, one edge of each arm being radial to the pivotal point, and means for locking said arms at any desired position with relation to the graduations.

3. In an instrument of the character described the combination with a plummet and a compass carried thereby, of arms provided with sight-slits by which the plummet is suspended.

4. In an instrument of the character described the combination with a head 40 having a threaded stud 41 with a thumb-nut, of a plummet carrying a compass, and arms provided with sight-slits by which the plummet is suspended, said arms uniting at the top and the threaded stud passing through at the point of intersection and said arms and the plummet being free to turn on the stud when the thumb-nut is loosened.

5. In an instrument of the character described the combination with a freely-suspended plate 27, of a head 40 rigidly secured thereto and having a threaded stud with a thumb-nut and a plummet carrying a compass and having arms provided with sight-slits which are swiveled on the stud and may be locked by the thumb-nut.

6. In an instrument of the character described the combination with a plate 27 and a plummet attached thereto, of a block 50 to which the plate is attached, the upper face of said block being a concave curve, a head 23 whose lower face is a convex curve corresponding with the curvature of the block and which is provided with a downwardly and outwardly tapering recess 53 and a bolt passing through said recess and engaging the block and having a spherical head resting upon head 23, so that said plate may oscillate freely.

7. In an instrument of the character described the combination with a vertically-adjustable frame, of a freely-suspended dial-plate, a plummet attached to the lower edge thereof and an oscillating arm pivoted to the dial-plate and having an edge radial to the pivotal point.

8. In an instrument of the character described the combination with a vertically-adjustable frame, of a dial-plate 27 freely suspended therefrom, a sight-tube carried by said plate, a plummet attached to the lower edge of said plate and a compass carried by the plummet.

9. In an instrument of the character described the combination with a base and a frame, of a plate 27 vertically adjustable relatively to the frame, a plummet attached to the lower edge of said plate and means for locking the plummet to the base when the plate and plummet are lowered.

10. In an instrument of the character described the combination with a base, a frame extending upward therefrom, plate 27 having at its upper end a block and a bolt passing through the frame and engaging the block whereby said block and plate may be moved vertically, of a plummet rigidly secured to the lower edge of the plate and a thumb-screw in the base whereby the plummet may be locked thereto when the plummet and plate are lowered by the bolt.

11. In an instrument of the character described the combination with a frame having a head 23 convex upon its lower side and provided with a downwardly and outwardly tapering recess 53, of a plate 27 having at its upper end a block curved to correspond with the head and a bolt 51 having a rounded head 52 which rests upon head 23 and a shank which passes through the recess and engages the block whereby said parts are secured together leaving the block and plate free to oscillate.

12. In an instrument of the character described the combination with a frame having a head 23 and a block 50 freely suspended therefrom and having a recess 54 with a stud 55 extending from the face thereof, of plate 27 having a recess 56 to receive the stud, a clamp engaging the face of the plate and provided with a threaded shank which passes through the block and a thumb-nut by which the parts are locked together.

In testimony whereof I affix my signature in presence of two witnesses.

JOHN S. BOGARDUS.

Witnesses:
A. M. WOOSTER,
S. W. ATHERTON.